3,584,062
α-METHYL-β-NITRO-m-(TRIFLUOROMETHYL) STYRENE
Leo R. Morris, Midland, Mich., assignor to The Dow Chemical Company, Midland, Mich.
No Drawing. Filed Jan. 17, 1969, Ser. No. 792,158
Int. Cl. C07c 79/12
U.S. Cl. 260—646          3 Claims

ABSTRACT OF THE DISCLOSURE

The present disclosure relates to the new compound α-methyl-β-nitro-m-(trifluoromethyl)styrene corresponding to the formula

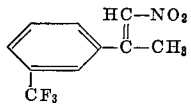

its method of preparation. This compound exhibits utility as a depressant for the central nervous system and as a pesticide.

SUMMARY OF THE INVENTION

The present invention is directed to the compound α-methyl-β-nitro-m-(trifluoromethyl)styrene corresponding to the formula

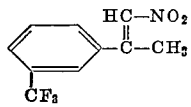

and its method of preparation.

The compound of the present invention is an amber liquid, essentially insoluble in water and soluble to a great degree in many organic solvents such as acetone and benzene.

The novel compound is found to be useful for administration to laboratory animals in studying the behavior thereof and in ascertaining drug effects on the central nervous system. Particularly in prolonging the effect of barbiturates and as a sedative. The compound is also useful as a pesticide in the control and kill of fungal organisms such as *Candida pelliculosa* and *Pullularis pullulans* and the pest Daphnia.

The α-methyl-β-nitro-m-(trifluoromethyl)styrene of the invention is prepared by the direct nitration of α-methyl-m-(trifluoromethyl)styrene. The reaction is exothermic and proceeds conveniently at temperatures of from about 15° to about 30° C.

In carrying out this reaction, the α-methyl-m-(trifluoromethyl)styrene reactant is contacted, while in an agitated state and usually in the presence of a cooling bath, e.g., an ice bath, with a nitrating agent. As nitrating agents, there can be employed nitric acid, fuming nitric acid, a mixture of nitric and sulfuric acids, other mixtures having as a major component one or more of nitric acid, nitronium tetrafluoroborate, dinitrogen pentoxide or acetyl nitrate. The preferred nitrating agent is a mixture of nitric and sulfuric acids. For best results, it is preferred that the nitration be conducted under relatively mild nitrating conditions, e.g., short reaction times and low temperatures within the ranges ordinarily employed when using a given nitrating agent.

When using the preferred nitric acid-sulfuric acid nitrating agent, the nitric acid may be supplied in any concentration; generally, though, it is convenient and preferred to employ either nitric acid of a concentration of at least about 70 percent $HNO_3$, or so-called "fuming nitric acid," generally having a concentration in excess of 70 percent, such as 90 percent or higher. Similarly, the sulfuric acid may be supplied to the reaction in any concentration; generally a concentration of at least about 90 percent $H_2SO_4$ is convenient and preferred. The ratio of nitric acid and sulfuric acid is not critical; an approximately 1:1 ratio is convenient and gives good results. The reaction is exothermic and goes forward readily while maintaining a temperature of from about 0° to about 30° C., usually of from about 15° to about 30° C. and is substantially complete within one half hour to two hours. With this preferred nitrating agent, higher temperatures can be used but the product yield and purity may be detrimentally affected through degradation. The preparation can be carried out in the presence of an inert liquid reaction medium; suitable media include, for example, nitrobenzene, methylene chloride, carbon tetrachloride and the like. However, since the α-methyl-m-(trifluoromethyl)styrene reactant is, itself, a liquid and thereby serves to facilitate the contacting of the reactants, there is generally no advantage to employing a separate liquid as a reaction medium or carrier.

The exact amounts of the α-methyl-m-(trifluoromethyl)styrene compound and nitrating agent employed are not critical, some of the desired product being obtained when employing any relative quantities of the reactants. As is understood by one skilled in the art, the preferred amounts of nitrating agent and compound to be nitrated actually employed will be determined from factors such as the concentration of the agent and the relative proportions of reactants. To illustrate, where a mixture of 70 percent nitric and 98 percent sulfuric acid, in a ratio of one part of the former to one and one-fourth parts of the latter, is employed as nitrating agent, an excess of the acid mixture to provide two parts by weight of nitric acid for each part of styrene compound generally gives good yields. Where the nitric acid employed is more dilute, and/or where the nitric acid forms a smaller proportion of the total nitrating agent employed, a larger excess of the nitrating agent to provide nitric acid, in up to a ten-fold excess of the α-methyl-m-(trifluoromethyl)styrene compound, is preferred. As has been indicated hereinbefore, for optimum in product yield and purity, the relative amounts of nitrating agent and compound to be used in a given operation are also related to reaction temperatures and times employed, a larger excess of nitric acid being preferred where it is desired to use short reaction times and/or to conduct the reaction at lower temperatures. Further, higher yields are generally favored by separating the product of nitration promptly upon the substantial completion of the reaction.

The foregoing full and complete disclosure makes it readily apparent that one skilled in the art can select appropriate operable reaction conditions for the various systems encompassed by the present invention.

Separation of the product from the reaction mixture is achieved by conventional procedures. Typically, the reaction mixture is poured over ice and the product is extracted into a suitable solvent, conveniently carbon tetrachloride. The extract is washed, dried with an inert desiccant such as anhydrous sodium sulfate and the product recovered by distillation.

The following example illustrates the present invention but is not to be construed as limiting.

EXAMPLE 1

α-methyl-β-nitro-m-(trifluoromethyl)styrene

α-Methyl-m-(trifluoromethyl)styrene (40.0 grams; 0.213 mole) is maintained in an agitated state in a reactor positioned in an ice bath. A mixture consisting of 34 grams of concentrated sulfuric acid (95.5 percent $H_2SO_4$) and 22 grams of concentrated nitric acid (70 percent $HNO_3$) is added thereto over a period of two hours; the addition being carried out in a controlled manner so that after an initial brief exotherm to 80° C., the bulk of the addition is made while maintaining the temperature of the reaction mixture between 15° and 30° C. After the addition is complete, the resulting product mixture is poured over ice and the liquid mass extracted with 200 milliliters of carbon tetrachloride. The organic extract is washed three times with 200 milliliter portions of water. The extract is dried with anhydrous sodium sulfate and the carbon tetrachloride removed during distillation under reduced pressure in a 30 inch Vigreux column. 13.9 grams of the crude α-methyl-β-nitro-m-(trifluoromethyl)styrene product having a boiling point of 106–110° C. at a 2 millimeters of mercury is recovered. The product is further purified by redistillation to obtain 4.0 grams of ~95 percent pure α - methyl-β-nitro-m-(trifluoromethyl)styrene having a boiling point of 83°–85° C. at 0.5 millimeter of mercury and a refractive index of $n_D^{25}$ 1.4955. Analysis of the product by infrared spectroscopy established that the compound is consistent with the assigned structure.

The compound of the invention is employed directly or as an active toxicant ingredient in pesticide compositions. For such use, the compound can be employed in an unmodified form or dispersed on a finely divided solid and employed as dusts. Such mixtures can also be dispersed in water with or without the aid of a surface-active agent and the resulting aqueous suspensions employed as sprays. In other procedures, the product can be employed as an active toxicant constituent in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing pesticidal concentrations of the α-methyl-β-nitro-m-(trifluoromethyl)styrene and usually from about 1 to 10,000 parts by weight of the compound per million parts of such composition.

In a representative operation, α-methyl-β-nitro-m-(trifluoromethyl)styrene when employed as the sole toxicant in a nutrient agar at a concentration of about 500 parts by weight of the compound per million parts of agar, is found to give 100 percent kill and control of the organisms *Candida pelliculosa* and *Pullularia pullulans*.

In another representative operation, an aqueous dispersion containing α-methyl-β-nitro-m-(trifluoromethyl)styrene as the sole toxicant at a concentration of 0.4 part by weight of the compound per million parts of the dispersion, is found to give complete control and kill of the pest Daphnia.

The compound of the invention is useful as a sedative. For such uses, the compound is administered to animals by conventional procedures such as subcutaneous or intraperitoneal injection or by oral administration. The compound can be mixed together with conventional carriers and excipients and can be administered in various forms such as tablets, capsules, powders and sterile injectable compositions. Aqueous compositions suitable for injection can be conveniently prepared by suspending the compound in water with the aid of one or more suspending agents such as methyl cellulose, gum acacia or the like.

Central nervous system activity of the novel compound is indicated by its effectiveness in prolonging hexobarbital sleep time in mice. In this determination, the mice receive a dosage of the compound at a rate of 100 milligrams per kilogram of body weight one hour before intraperitoneal administration of hexobarbital at a dosage rate of 100 milligrams per kilogram of body weight. Untreated control mice are similarly injected with hexobarbital at a dosage rate of 100 milligrams per kilogram of body weight to serve as checks. The hexobarbital injection induces sleep in both the treated and untreated mice. All the animals are placed on their backs and the period of time until each mouse rights itself is recorded as sleep time. The ratio of the average sleep time for the treated mice to that for the untreated mice is expressed as hexobarbital sleep time ratio. It is found that the sleep time ratio for the treated mice is 2.4 (i.e., the sleep time for the treated mice is 2.4 times longer than that of the untreated mice).

In another operation, the effectiveness of the novel compound is indicated by its ability to induce sleep in hexobarbital treated mice. In this determination, the mice are are injected intraperitoneally with an aqueous solution of hexobarbital at a dosage of 100 milligrams per kilogram of body weight. The hexobarbital injection induces sleep in the mice. All the animals are placed on their backs until the righting reflex is regained. At this time, each animal is injected intraperitoneally with an aqueous solution of α - methyl - β - nitro - m - (trifluoromethyl)styrene at a dosage of 100 milligrams per kilogram of body weight. It is found that the mice treated with the compound of the invention again lose their righting reflex, i.e., sleep is induced. Check mice which regain the righting reflex after the hexobarbital injection and which are not treated with the compound of the invention all retain this reflex.

PREPARATION OF STARTING MATERIALS

The α-methyl - m - (trifluoromethyl)styrene employed as a starting material is prepared by the method taught by Backman et al., J. Amer. Chem. Soc., 69, pages 2022–25(194) wherein α-α-dimethyl - 3 - trifluoromethylbenzyl alcohol is prepared by a Grignard reaction and is dehydrated to the styrene with potassium acid sulfate under a nitrogen atmosphere.

What is claimed is:
1. α-Methyl-β-nitro-m-(trifluoromethyl)styrene.
2. Method of preparing α - methyl-β-nitro-m-trifluoromethyl styrene wherein α-methyl-m-(trifluoromethyl)styrene is contacted with a nitrating agent at a temperature of from about 15° to about 30° C.
3. Method of claim 2 wherein the nitrating agent is a mixture of concentrated nitric acid and concentrated sulfuric acid.

References Cited
UNITED STATES PATENTS 3,105,004   9/1963   Pyne _____ 260—646X BENJAMIN R. PADGETT, Primary Examiner E. A. MILLER, Assistant Examiner U.S. Cl. X.R.

260—651; 424—349